(12) United States Patent
Huang-Fu et al.

(10) Patent No.: US 11,064,450 B2
(45) Date of Patent: Jul. 13, 2021

(54) SYNCHRONIZATION OF QOS FLOWS AND RULES IN MOBILE COMMUNICATIONS

(71) Applicant: MediaTek Inc., Hsinchu (TW)

(72) Inventors: Chien-Chun Huang-Fu, Hsinchu (TW); Shang-Ru Mo, Hsinchu (TW); Chi-Hsien Chen, Hsinchu (TW)

(73) Assignee: MediaTek Inc.

( * ) Notice: Subject to any disclaimer, the term of this patent is extended or adjusted under 35 U.S.C. 154(b) by 0 days.

(21) Appl. No.: 16/680,331

(22) Filed: Nov. 11, 2019

(65) Prior Publication Data

US 2020/0154379 A1 May 14, 2020

Related U.S. Application Data

(60) Provisional application No. 62/758,743, filed on Nov. 12, 2018.

(51) Int. Cl.
| | |
|---|---|
| *H04W 56/00* | (2009.01) |
| *H04W 28/02* | (2009.01) |
| *H04W 48/18* | (2009.01) |
| *H04W 8/08* | (2009.01) |
| *H04W 60/00* | (2009.01) |
| *H04W 80/10* | (2009.01) |

(52) U.S. Cl.
CPC .......... *H04W 56/001* (2013.01); *H04W 8/08* (2013.01); *H04W 28/0268* (2013.01); *H04W 48/18* (2013.01); *H04W 60/00* (2013.01); *H04W 80/10* (2013.01)

(58) Field of Classification Search
None
See application file for complete search history.

(56) References Cited

U.S. PATENT DOCUMENTS

| | | | |
|---|---|---|---|
| 2013/0083771 A1 | 4/2013 | Zhao et al. | |
| 2018/0198867 A1 | 7/2018 | Dao et al. | |
| 2019/0116518 A1* | 4/2019 | Stojanovski | H04L 67/146 |
| 2019/0261449 A1* | 8/2019 | Kim | H04W 48/16 |
| 2020/0037386 A1* | 1/2020 | Park | H04L 29/06 |
| 2020/0145876 A1* | 5/2020 | Dao | H04W 28/06 |

(Continued)

FOREIGN PATENT DOCUMENTS

| | | |
|---|---|---|
| CN | 108260162 A | 7/2018 |
| EP | 1248431 A1 | 10/2002 |

(Continued)

OTHER PUBLICATIONS

Taiwan Intellectual Property Office, Office Action for Taiwan Patent Application No. 108140941, dated Aug. 25, 2020.

(Continued)

*Primary Examiner* — Eunsook Choi
(74) *Attorney, Agent, or Firm* — Andy M. Han; Han IP PLLC (57) ABSTRACT

Various examples and schemes pertaining to synchronization of quality of service (QoS) flows and rules in mobile communications are described. An apparatus establishes one or more protocol data unit (PDU) sessions with a wireless network. The apparatus then transmits a message to the wireless network to result in synchronization of status of at least one or more aspects related to QoS rules or QoS flows with respect to the one or more PDU sessions.

19 Claims, 4 Drawing Sheets

(56) References Cited

U.S. PATENT DOCUMENTS

| | | | |
|---|---|---|---|
| 2020/0178158 A1* | 6/2020 | Won | H04W 48/06 |
| 2020/0280948 A1* | 9/2020 | Youn | H04W 60/005 |
| 2020/0288367 A1* | 9/2020 | Kim | H04W 36/00 |
| 2020/0359274 A1* | 11/2020 | Zhu | H04W 76/16 |
| 2020/0367297 A1* | 11/2020 | Dao | H04W 60/00 |

FOREIGN PATENT DOCUMENTS

| | | |
|---|---|---|
| WO | WO 2018127597 A1 | 7/2018 |
| WO | WO 2018130968 A1 | 7/2018 |

OTHER PUBLICATIONS

China National Intellectual Property Administration, International Search Report and Written Opinion for PCT/CN2019/117473, dated Jan. 23, 2020.

* cited by examiner

SYNCHRONIZATION OF QOS FLOWS AND RULES IN MOBILE COMMUNICATIONS

CROSS REFERENCE TO RELATED PATENT APPLICATION(S)

The present disclosure is part of a non-provisional application claiming the priority benefit of U.S. Patent Application No. 62/758,743, filed on 12 Nov. 2018, the content of which being incorporated by reference in its entirety.

TECHNICAL FIELD

The present disclosure is generally related to mobile communications and, more particularly, to techniques pertaining to synchronization of quality of service (QoS) flows and rules in mobile communications.

BACKGROUND

Unless otherwise indicated herein, approaches described in this section are not prior art to the claims listed below and are not admitted as prior art by inclusion in this section.

In an Evolved Packet System (EPS), a tracking area update (TAU) procedure can be used to synchronize status of the EPS bearers between a wireless network and a user equipment (UE) with respect to a packet data network (PDN) connection. However, currently it is not defined in the $3^{rd}$ Generation Partnership Project (3GPP) specification to synchronize protocol data unit (PDU) sessions, QoS flows and QoS rules in a $5^{th}$ Generation System (5GS). Specifically, each QoS flow within a given PDU session is associated with one or more QoS rules. However, currently synchronization is only to the PDU session level but not to the QoS flow level or QoS rule level.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is propose various concepts, solutions, schemes, techniques, designs and methods to address aforementioned issues.

In one aspect, a method may involve a processor of an apparatus establishing one or more PDU sessions with a wireless network. The method may also involve the processor transmitting a message to the wireless network to result in synchronization of status of at least one or more aspects related to QoS rules or QoS flows with respect to the one or more PDU sessions.

In one aspect, a method may involve a processor of an apparatus establishing one or more PDU sessions with a wireless network. The method may also involve the processor transmitting a message to the wireless network to result in synchronization of status of one or more QoS flows, one or more QoS rules, and the one or more PDU sessions. The method may further involve the processor receiving a reply from the wireless network responsive to the transmitting. The method may additionally involve the processor releasing or correcting a PDU session status of the one or more PDU sessions based on the reply.

It is noteworthy that, although description provided herein may be in the context of certain radio access technologies, networks and network topologies such as Ethernet, the proposed concepts, schemes and any variation(s)/derivative(s) thereof may be implemented in, for and by other types of radio access technologies, networks and network topologies such as, for example and without limitation, 5G, New Radio (NR), Long-Term Evolution (LTE), LTE-Advanced, LTE-Advanced Pro, narrowband (NB), narrowband Internet of Things (NB-IoT), Wi-Fi and any future-developed networking and communication technologies. Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED IMPLEMENTATIONS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to synchronization of QoS flows and rules in mobile communications. According to the present disclosure, a number of possible solutions may be implemented separately or jointly. That is, although these possible solutions may be described below separately, two or more of these possible solutions may be implemented in one combination or another.

Figure 1:
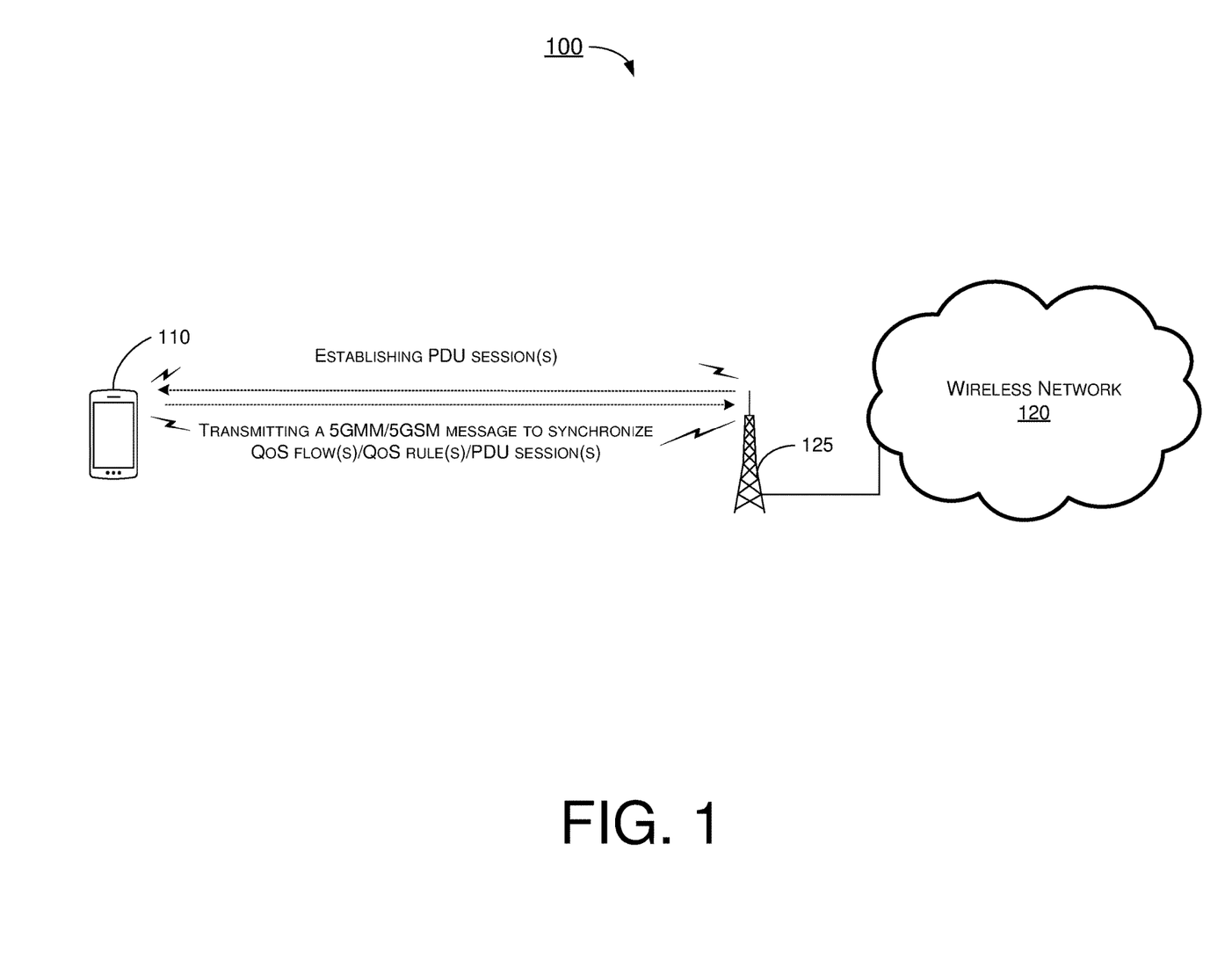
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. Referring to FIG. 1, network environment 100 may involve a UE 110 in wireless communication with a wireless network 120 (e.g., a 5G NR mobile network). UE 110 may initially be in wireless communication with wireless network 120 via a base station or network node 125 (e.g., an eNB, gNB or transmit-receive point (TRP)). In network environment 100, UE 110 and wireless network 120 may implement various schemes pertaining to synchronization of QoS flows and rules in mobile communications in accordance with the present disclosure, as described herein.

Under a proposed scheme in accordance with the present disclosure, UE 110 may utilize a $5^{th}$ Generation Mobility Management (5GMM) message to synchronize the status of $5^{th}$ Generation Session Management (5GSM) PDU sessions. Under the proposed scheme, the 5GMM message used for synchronization may include an existing 5GMM message (e.g., one that is defined in Release 15 (Rel-15) of the 3GPP specification) with a new information element (IE). The existing 5GMM message may be, for example and without limitation, a REGISTER request. Alternatively, the 5GMM message used for synchronization may include a new 5GMM message (e.g., one to be defined in Release 16 (Rel-16) or a future release of the 3GPP specification) for a specific purpose. Under the proposed scheme, UE 110 may transmit the 5GMM message to network node 125 of wireless network 120 to synchronize the status of one or more QoS flows, one or more QoS rules and/or one or more PDU sessions. It is noteworthy that this 5GMM message-based mechanism may be utilized to synchronize the status of all PDU sessions across multiple session management functions (SMFs) in wireless network 120. Upon receiving the 5GMM message from UE 110, wireless network 120 may transmit, via network node 125, a reply. In response, based on the reply, UE 110 may release or correct a PDU session status of the one or more established PDU sessions.

Under another proposed scheme in accordance with the present disclosure, UE 110 may utilize a 5GSM message to synchronize the status of 5GSM PDU sessions. Under the proposed scheme, the 5GSM message used for synchronization may include an existing 5GSM message (e.g., one that is defined in Rel-15 of the 3GPP specification) with a new IE. The existing 5GSM message may be, for example and without limitation, a PDU modification request or a 5GSM status message. Alternatively, the 5GSM message used for synchronization may include a new 5GSM message (e.g., one to be defined in Rel-16 or a future release of the 3GPP specification) for a specific purpose. Under the proposed scheme, UE 110 may transmit the 5GSM message to network node 125 of wireless network 120 to synchronize the status of one or more QoS flows, one or more QoS rules and/or one or more PDU sessions. It is noteworthy that this 5GSM message-based mechanism may be utilized to synchronize the status of a specific PDU session. Moreover, this 5GSM message-based mechanism may be utilized to synchronize the status of one or more PDU sessions on a specific data network name (DNN), a specific single-network slice selection assistance information (S-NSSAI), or both the specific DNN and the specific S-NSSAI. Upon receiving the 5GMM message from UE 110, wireless network 120 may transmit, via network node 125, a reply. In response, based on the reply, UE 110 may release or correct a PDU session status of the one or more established PDU sessions.

Illustrative Implementations

Figure 2:
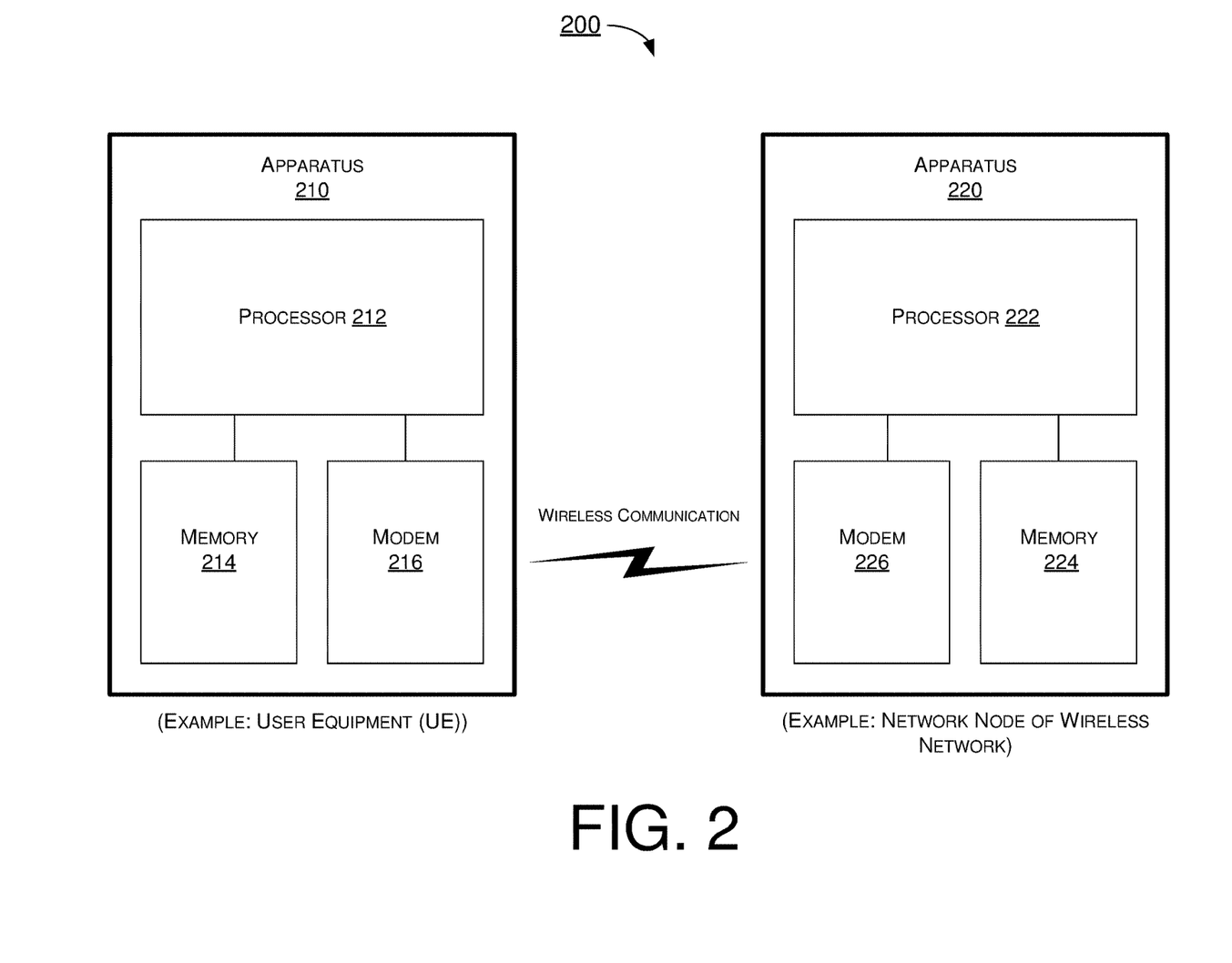
FIG. 2 is a block diagram of an example communication system in accordance with an implementation of the present disclosure.

FIG. 2 illustrates an example communication system 200 having an example apparatus 210 and an example apparatus 220 in accordance with an implementation of the present disclosure. Each of apparatus 210 and apparatus 220 may perform various functions to implement schemes, techniques, processes and methods described herein pertaining to synchronization of QoS flows and rules in mobile communications, including various schemes described above as well as processes described below.

Each of apparatus 210 and apparatus 220 may be a part of an electronic apparatus, which may be a UE such as a vehicle, a portable or mobile apparatus, a wearable apparatus, a wireless communication apparatus or a computing apparatus. For instance, each of apparatus 210 and apparatus 220 may be implemented in an electronic control unit (ECU) of a vehicle, a smartphone, a smartwatch, a personal digital assistant, a digital camera, or a computing equipment such as a tablet computer, a laptop computer or a notebook computer. Each of apparatus 210 and apparatus 220 may also be a part of a machine type apparatus, which may be an IoT or NB-IoT apparatus such as an immobile or a stationary apparatus, a home apparatus, a wire communication apparatus or a computing apparatus. For instance, each of apparatus 210 and apparatus 220 may be implemented in a smart thermostat, a smart fridge, a smart door lock, a wireless speaker or a home control center. Alternatively, each of apparatus 210 and apparatus 220 may be implemented in the form of one or more integrated-circuit (IC) chips such as, for example and without limitation, one or more single-core processors, one or more multi-core processors, one or more complex-instruction-set-computing (CISC) processors, or one or more reduced-instruction-set-computing (RISC) processors. Each of apparatus 210 and apparatus 220 may include at least some of those components shown in FIG. 2 such as a processor 212 and a processor 222, respectively. Each of apparatus 210 and apparatus 220 may further include one or more other components not pertinent to the proposed scheme of the present disclosure (e.g., internal power supply, display device and/or user interface device), and, thus, such component(s) of each of apparatus 210 and apparatus 220 are neither shown in FIG. 2 nor described below in the interest of simplicity and brevity.

In some implementations, at least one of apparatus 210 and apparatus 220 may be a part of an electronic apparatus, which may be a vehicle, a roadside unit (RSU), network node or base station (e.g., eNB, gNB or TRP), a small cell, a router or a gateway. For instance, at least one of apparatus 210 and apparatus 220 may be implemented in a vehicle in a vehicle-to-vehicle (V2V) or vehicle-to-everything (V2X) network, an eNodeB in an LTE, LTE-Advanced or LTE-Advanced Pro network or in a gNB in a 5G, NR, IoT or NB-IoT network. Alternatively, at least one of apparatus 210 and apparatus 220 may be implemented in the form of one or more IC chips such as, for example and without limitation, one or more single-core processors, one or more multi-core processors, or one or more CISC or RISC processors.

In one aspect, each of processor 212 and processor 222 may be implemented in the form of one or more single-core processors, one or more multi-core processors, or one or more CISC or RISC processors. That is, even though a singular term "a processor" is used herein to refer to processor 212 and processor 222, each of processor 212 and processor 222 may include multiple processors in some implementations and a single processor in other implementations in accordance with the present disclosure. In another aspect, each of processor 212 and processor 222 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 212 and processor 222 is a special-purpose machine specifically designed, arranged and configured to perform specific tasks including synchronization of QoS flows and rules in mobile communications in accordance with various implementations of the present disclosure.

In some implementations, apparatus 210 may also include a wireless transceiver 216 coupled to processor 212 and capable of wirelessly transmitting and receiving data over a wireless link (e.g., a 3GPP connection or a non-3GPP connection). In some implementations, apparatus 210 may further include a memory 214 coupled to processor 212 and capable of being accessed by processor 212 and storing data therein. In some implementations, apparatus 220 may also include a wireless transceiver 226 coupled to processor 222 and capable of wirelessly transmitting and receiving data over a wireless link (e.g., a 3GPP connection or a non-3GPP connection). In some implementations, apparatus 220 may further include a memory 224 coupled to processor 222 and capable of being accessed by processor 222 and storing data therein. Accordingly, apparatus 210 and apparatus 220 may wirelessly communicate with each other via transceiver 216 and transceiver 226, respectively.

To aid better understanding, the following description of the operations, functionalities and capabilities of each of apparatus 210 and apparatus 220 is provided in the context of an NR communication environment in which apparatus 210 is implemented in or as a wireless communication device, a communication apparatus, a UE or an IoT device (e.g., UE 110) and apparatus 220 is implemented in or as a base station or network node (e.g., network node 125).

In one aspect of synchronization of QoS flows and rules in mobile communications in accordance with the present disclosure, processor 212 of apparatus 210 may establish, via transceiver 216, one or more PDU sessions with a wireless network (e.g., wireless network 120) via apparatus 220 as a network node (e.g., network node 125). Additionally, processor 212 may transmit, via transceiver 216, a message to the wireless network via apparatus 220 to result in synchronization of status of at least one or more aspects related to QoS rules or QoS flows with respect to the one or more PDU sessions.

In some implementations, in transmitting the message, processor 212 may transmit a 5GMM message or a 5GSM message.

In some implementations, the 5GMM message may include an existing 5GMM message with a new IE. In such cases, the existing 5GMM message may include a REGISTER request.

In some implementations, the 5GSM message may include an existing 5GSM message with a new IE. In such cases, the existing 5GSM message may include a PDU modification request or a 5GSM status message.

In some implementations, the 5GMM message may include a new 5GMM message for a specific purpose of synchronization of status of the one or more aspects related to QoS rules or QoS flows with respect to the one or more PDU sessions.

In some implementations, the 5GSM message may include a new 5GSM message for a specific purpose of synchronization of status of the one or more aspects related to QoS rules or QoS flows with respect to the one or more PDU sessions.

In some implementations, the synchronization of the status of at least one or more aspects related to QoS rules or QoS flows with respect to the one or more PDU sessions may include synchronization of status of the one or more aspects related to QoS rules or QoS flows with respect to the one or more PDU sessions across a plurality of SMFs in the wireless network.

In some implementations, the synchronization of the status of at least one or more aspects related to QoS rules or QoS flows with respect to the one or more PDU sessions may include synchronization of status of the one or more aspects related to QoS rules or QoS flows with respect to a specific PDU session of the one or more PDU sessions.

In some implementations, the synchronization of the status of at least one or more aspects related to QoS rules or QoS flows with respect to the one or more PDU sessions may include synchronization of status of the one or more PDU sessions on a specific DNN, a specific S-NSSAI, or both the specific DNN and the specific S-NSSAI.

In some implementations, the synchronization of the status of at least one or more aspects related to QoS rules or QoS flows with respect to the one or more PDU sessions may include synchronization of status of one or more QoS flows and one or more QoS rules with respect to the one or more PDU sessions. In some implementations, the synchronization of the status of the one or more QoS flows and the one or more QoS rules with respect to the PDU session may further include synchronization of status of the one or more PDU sessions.

In some implementations, processor 212 may perform additional operations. For instance, processor 212 may receive, via transceiver 216, a reply from the wireless network via apparatus 220 responsive to the transmitting. Moreover, processor 212 may release or correct a PDU session status of the one or more PDU sessions based on the reply.

In another aspect of synchronization of QoS flows and rules in mobile communications in accordance with the present disclosure, processor 212 of apparatus 210 may establish, via transceiver 216, one or more PDU sessions with a wireless network (e.g., wireless network 120) via apparatus 220 as a network node (e.g., network node 125). Additionally, processor 212 may transmit, via transceiver 216, a message to the wireless network via apparatus 220 to result in synchronization of status of one or more QoS flows, one or more QoS rules, and the one or more PDU sessions. Moreover, processor 212 may receive, via transceiver 216, a reply from the wireless network via apparatus 220 responsive to the transmitting. Furthermore, processor 212 may release or correct a PDU session status of the one or more PDU sessions based on the reply.

In some implementations, in transmitting the message, processor 212 may transmit a 5GMM message or a 5GSM message.

In some implementations, the synchronization may include synchronization across a plurality of SMFs in the wireless network.

In some implementations, the synchronization may include synchronization on a specific DNN, a specific S-NSSAI, or both the specific DNN and the specific S-NSSAI.

Illustrative Processes

Figure 3:
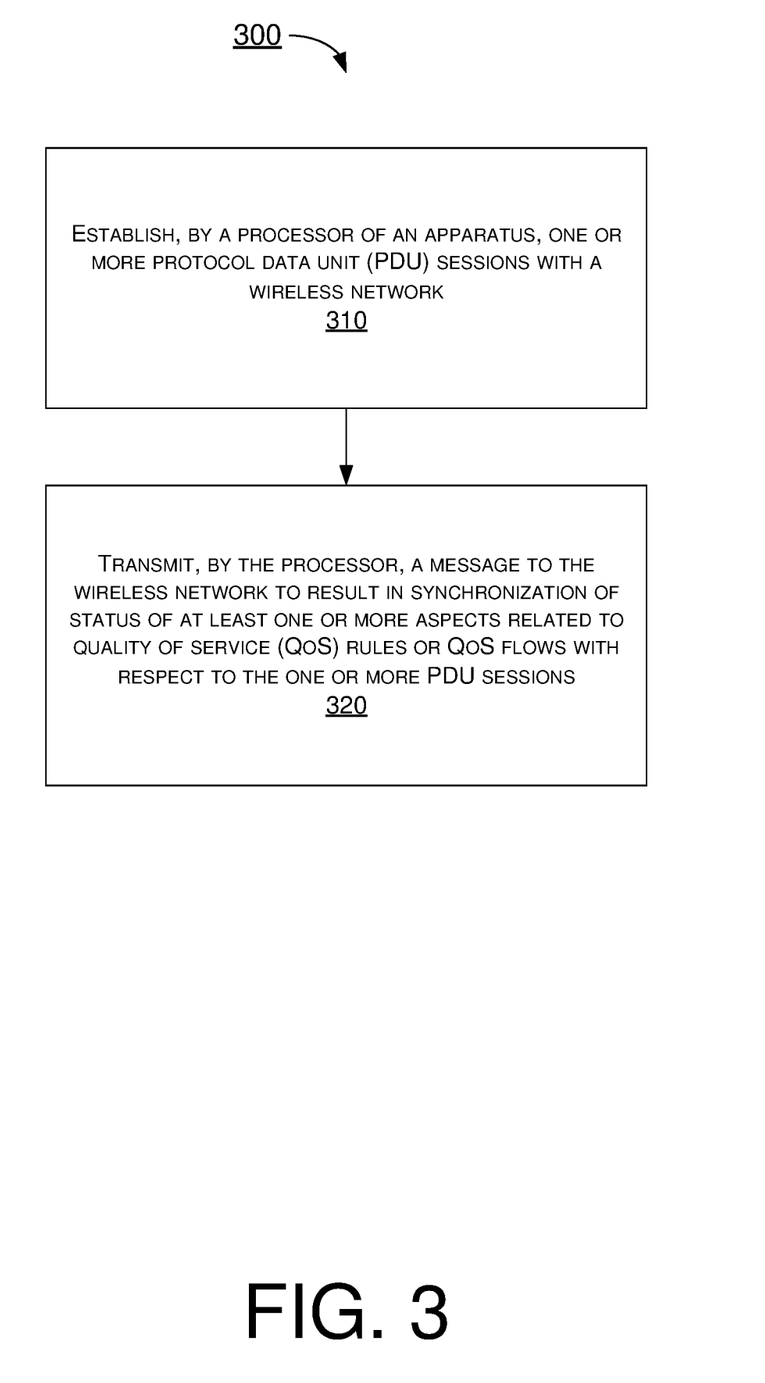
FIG. 3 is a flowchart of an example process in accordance with an implementation of the present disclosure.

FIG. 3 illustrates an example process 300 in accordance with an implementation of the present disclosure. Process 300 may be an example implementation of the proposed schemes described above with respect to synchronization of QoS flows and rules in mobile communications in accordance with the present disclosure. Process 300 may represent an aspect of implementation of features of apparatus 210 and apparatus 220. Process 300 may include one or more operations, actions, or functions as illustrated by one or more of blocks 310 and 320. Although illustrated as discrete blocks, various blocks of process 300 may be divided into additional blocks, combined into fewer blocks, or eliminated, depending on the desired implementation. Moreover, the blocks of process 300 may be executed in the order shown in FIG. 3 or, alternatively, in a different order. Process 300 may also be repeated partially or entirely. Process 300 may be implemented by apparatus 210, apparatus 220 and/or any suitable wireless communication device, UE, RSU, base station or machine type devices. Solely for illustrative purposes and without limitation, process 300 is described below in the context of apparatus 210 as UE 110 and apparatus 220 as network node 125. Process 300 may begin at block 310.

At 310, process 300 may involve processor 212 of apparatus 210 establishing, via transceiver 216, one or more PDU sessions with a wireless network (e.g., wireless network 120) via apparatus 220 as a network node (e.g., network node 125). Process 300 may proceed from 310 to 320.

At 320, process 300 may involve processor 212 transmitting, via transceiver 216, a message to the wireless network via apparatus 220 to result in synchronization of status of at least one or more aspects related to QoS rules or QoS flows with respect to the one or more PDU sessions.

In some implementations, in transmitting the message, process 300 may involve processor 212 transmitting a 5GMM message or a 5GSM message.

In some implementations, the 5GMM message may include an existing 5GMM message with a new IE. In such cases, the existing 5GMM message may include a REGISTER request.

In some implementations, the 5GSM message may include an existing 5GSM message with a new IE. In such cases, existing 5GSM message may include a PDU modification request or a 5GSM status message.

In some implementations, the 5GMM message may include a new 5GMM message for a specific purpose of synchronization of status of the one or more aspects related to QoS rules or QoS flows with respect to the one or more PDU sessions.

In some implementations, the 5GSM message may include a new 5GSM message for a specific purpose of synchronization of status of the one or more aspects related to QoS rules or QoS flows with respect to the one or more PDU sessions.

In some implementations, the synchronization of the status of at least one or more aspects related to QoS rules or QoS flows with respect to the one or more PDU sessions may include synchronization of status of the one or more aspects related to QoS rules or QoS flows with respect to the one or more PDU sessions across a plurality of SMFs in the wireless network.

In some implementations, the synchronization of the status of at least one or more aspects related to QoS rules or QoS flows with respect to the one or more PDU sessions may include synchronization of status of the one or more aspects related to QoS rules or QoS flows with respect to a specific PDU session of the one or more PDU sessions.

In some implementations, the synchronization of the status of at least one or more aspects related to QoS rules or QoS flows with respect to the one or more PDU sessions may include synchronization of status of the one or more PDU sessions on a specific DNN, a specific S-NSSAI, or both the specific DNN and the specific S-NSSAI.

In some implementations, the synchronization of the status of at least one or more aspects related to QoS rules or QoS flows with respect to the one or more PDU sessions may include synchronization of status of one or more QoS flows and one or more QoS rules with respect to the one or more PDU sessions. In some implementations, the synchronization of the status of the one or more QoS flows and the one or more QoS rules with respect to the PDU session may further include synchronization of status of the one or more PDU sessions.

In some implementations, process 300 may involve processor 212 performing additional operations. For instance, process 300 may involve processor 212 receiving, via transceiver 216, a reply from the wireless network via apparatus 220 responsive to the transmitting. Moreover, process 300 may involve processor 212 releasing or correcting a PDU session status of the one or more PDU sessions based on the reply.

Figure 4:
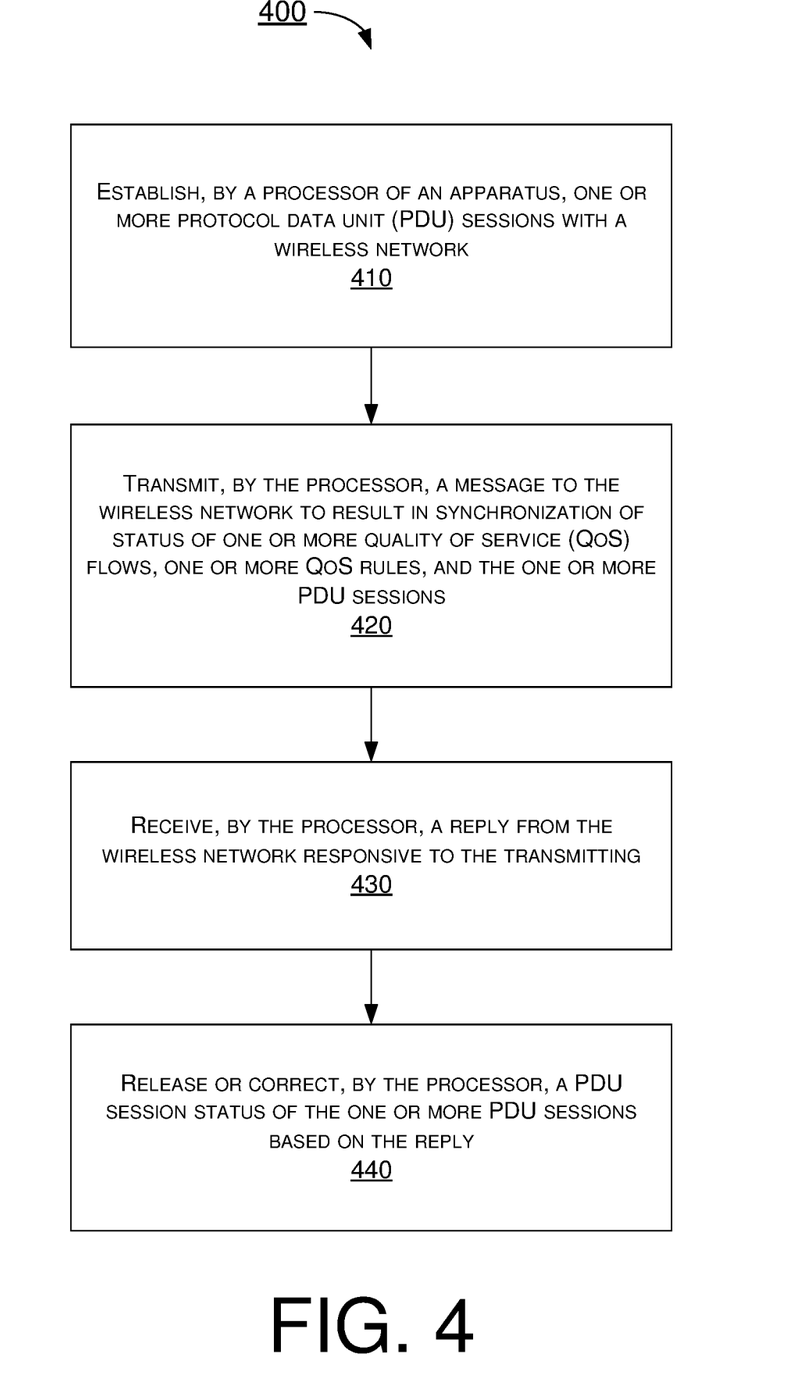
FIG. 4 is a flowchart of an example process in accordance with an implementation of the present disclosure.

FIG. 4 illustrates an example process 400 in accordance with an implementation of the present disclosure. Process 400 may be an example implementation of the proposed schemes described above with respect to synchronization of QoS flows and rules in mobile communications in accordance with the present disclosure. Process 400 may represent an aspect of implementation of features of apparatus 210 and apparatus 220. Process 400 may include one or more operations, actions, or functions as illustrated by one or more of blocks 410, 420, 430 and 440. Although illustrated as discrete blocks, various blocks of process 400 may be divided into additional blocks, combined into fewer blocks, or eliminated, depending on the desired implementation. Moreover, the blocks of process 400 may be executed in the order shown in FIG. 4 or, alternatively, in a different order. Process 400 may also be repeated partially or entirely. Process 400 may be implemented by apparatus 210, apparatus 220 and/or any suitable wireless communication device, UE, RSU, base station or machine type devices. Solely for illustrative purposes and without limitation, process 400 is described below in the context of apparatus 210 as UE 110 and apparatus 220 as network node 125. Process 400 may begin at block 410.

At 410, process 400 may involve processor 212 of apparatus 210 establishing, via transceiver 216, one or more PDU sessions with a wireless network (e.g., wireless network 120) via apparatus 220 as a network node (e.g., network node 125). Process 400 may proceed from 410 to 420.

At 420, process 400 may involve processor 212 transmitting, via transceiver 216, a message to the wireless network via apparatus 220 to result in synchronization of status of one or more QoS flows, one or more QoS rules, and the one or more PDU sessions. Process 400 may proceed from 420 to 430.

At 430, process 400 may involve processor 212 receiving, via transceiver 216, a reply from the wireless network via apparatus 220 responsive to the transmitting. Process 400 may proceed from 430 to 440.

At 440, process 400 may involve processor 212 releasing or correcting a PDU session status of the one or more PDU sessions based on the reply.

In some implementations, in transmitting the message, process 400 may involve processor 212 transmitting a 5G MM message or a 5GSM message.

In some implementations, the synchronization may include synchronization across a plurality of SMFs in the wireless network.

In some implementations, the synchronization may include synchronization on a specific DNN, a specific S-NSSAI, or both the specific DNN and the specific S-NSSAI.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
   establishing, by a processor of an apparatus, one or more protocol data unit (PDU) sessions with a wireless network;
   transmitting, by the processor, a message to the wireless network to result in synchronization of status of at least one or more quality of service (QoS) rules or QoS flows with respect to the one or more PDU sessions;
   receiving, by the processor, a reply from the wireless network responsive to the transmitting; and
   releasing or correcting, by the processor, a PDU session status of the one or more PDU sessions based on the reply.

2. The method of claim 1, wherein the transmitting of the message comprises transmitting a $5^{th}$ Generation Mobility Management (5GMM) message or a $5^{th}$ Generation Session Management (5GSM) message.

3. The method of claim 2, wherein the 5GMM message comprises an existing 5GMM message with a new information element (IE).

4. The method of claim 3, wherein the existing 5GMM message comprises a REGISTER request.

5. The method of claim 2, wherein the 5GSM message comprises an existing 5GSM message with a new information element (IE).

6. The method of claim 5, wherein the existing 5GSM message comprises a PDU modification request or a 5GSM status message.

7. The method of claim 2, wherein the 5GMM message comprises a new 5GMM message for a specific purpose of synchronization of status of the one or more QoS rules or QoS flows with respect to the one or more PDU sessions.

8. The method of claim 2, wherein the 5GSM message comprises a new 5GSM message for a specific purpose of synchronization of status of the one or more QoS rules or QoS flows with respect to the one or more PDU sessions.

9. The method of claim 1, wherein the synchronization of the status of at least one or more QoS rules or QoS flows with respect to the one or more PDU sessions comprises synchronization of status of the one or more QoS rules or QoS flows with respect to the one or more PDU sessions across a plurality of session management functions (SMFs) in the wireless network.

10. The method of claim 1, wherein the synchronization of the status of at least one or more QoS rules or QoS flows with respect to the one or more PDU sessions comprises synchronization of status of the one or more QoS rules or QoS flows with respect to a specific PDU session of the one or more PDU sessions.

11. The method of claim 1, wherein the synchronization of the status of at least one or more QoS rules or QoS flows with respect to the one or more PDU sessions comprises synchronization of status of the one or more PDU sessions on a specific data network name (DNN).

12. The method of claim 1, wherein the synchronization of the status of at least one or more QoS rules or QoS flows with respect to the one or more PDU sessions comprises synchronization of status of the one or more PDU sessions on a specific single-network slice selection assistance information (S-NSSAI).

13. The method of claim 1, wherein the synchronization of the status of at least one or more QoS rules or QoS flows with respect to the one or more PDU sessions comprises synchronization of status of the one or more PDU sessions on a specific data network name (DNN) and a specific single-network slice selection assistance information (S-NSSAI).

14. The method of claim 1, wherein the synchronization of the status of at least one or more QoS rules or QoS flows with respect to the one or more PDU sessions comprises synchronization of status of one or more QoS flows and one or more QoS rules with respect to the one or more PDU sessions.

15. The method of claim 14, wherein the synchronization of the status of the one or more QoS flows and the one or more QoS rules with respect to the PDU session further comprises synchronization of status of the one or more PDU sessions.

16. A method, comprising:
   establishing, by a processor of an apparatus, one or more protocol data unit (PDU) sessions with a wireless network;
   transmitting, by the processor, a message to the wireless network to result in synchronization of status of one or more quality of service (QoS) flows, one or more QoS rules, and the one or more PDU sessions;
   receiving, by the processor, a reply from the wireless network responsive to the transmitting; and
   releasing or correcting, by the processor, a PDU session status of the one or more PDU sessions based on the reply.

17. The method of claim 16, wherein the transmitting of the message comprises transmitting a $5^{th}$ Generation Mobility Management (5GMM) message or a $5^{th}$ Generation Session Management (5GSM) message.

18. The method of claim 16, wherein the synchronization comprises synchronization across a plurality of session management functions (SMFs) in the wireless network.

19. The method of claim 16, wherein the synchronization comprises synchronization on a specific data network name (DNN), a specific single-network slice selection assistance information (S-NSSAI), or both the specific DNN and the specific S-NSSAI.

* * * * *